United States Patent
Su et al.

(10) Patent No.: US 11,032,674 B2
(45) Date of Patent: Jun. 8, 2021

(54) BROADCAST MULTICAST SERVICE CENTER FOR MBMS BROADCAST SERVICE MANAGEMENT AND METHOD THEREOF

(71) Applicant: INDUSTRIAL TECHNOLOGY RESEARCH INSTITUTE, Hsinchu (TW)

(72) Inventors: Tzu-Hsiang Su, Hsinchu (TW); Kuo-Huang Hsu, Hsinchu (TW); Yu-Che Wang, Hsinchu (TW); Yu-Dai Yan, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 48 days.

(21) Appl. No.: 16/697,476

(22) Filed: Nov. 27, 2019

(65) Prior Publication Data

US 2021/0029512 A1  Jan. 28, 2021

(30) Foreign Application Priority Data

Jul. 23, 2019 (TW) .................... 108125993

(51) Int. Cl.
*H04W 72/00* (2009.01)
*H04W 4/06* (2009.01)
(Continued)

(52) U.S. Cl.
CPC .............. *H04W 4/06* (2013.01); *H04W 4/40* (2018.02); *H04W 24/08* (2013.01);
(Continued)

(58) Field of Classification Search
None
See application file for complete search history.

(56) References Cited

U.S. PATENT DOCUMENTS 8,861,419 B2 * 10/2014 Korus ................ H04W 72/005
370/312
9,426,743 B2 * 8/2016 Lee .................... H04W 52/0229
(Continued)

FOREIGN PATENT DOCUMENTS

CN        102326421        1/2012
CN        102256210        11/2016
(Continued)

OTHER PUBLICATIONS

Extended European Search Report for European Patent Application No. 20154756.9 dated Aug. 26, 2020.
(Continued)

*Primary Examiner* — Ayanah S George
(74) *Attorney, Agent, or Firm* — Amin, Turocy & Watson LLP

(57) ABSTRACT

Provided are a broadcast multicast service center and a method applicable to a multimedia broadcast multicast service (MBMS) broadcast service management. The method includes: monitoring a service connection of a V2X between an application server and user equipment to generate a resource merging instruction when the service connection has no network traffic; searching for other service resources that are currently being executed and can share a service according to the resource merging instruction; analyzing the other service resources and the service connection through quality of service parameter screening and a broadcast service area comparison to determine a selected service resource from the other service resources; and adjusting a scheduling period of the service connection to be smaller than a scheduling period of the selected service resource to enable subsequent network traffic packets of the service connection to share network traffic of the selected service resource.

14 Claims, 12 Drawing Sheets

(51) Int. Cl.
*H04W 4/40* (2018.01)
*H04W 24/08* (2009.01)
*H04W 28/02* (2009.01)
*H04W 72/10* (2009.01)

(52) U.S. Cl.
CPC ..... *H04W 28/0268* (2013.01); *H04W 72/005* (2013.01); *H04W 72/10* (2013.01)

(56) References Cited

U.S. PATENT DOCUMENTS

| | | |
|---|---|---|
| 2013/0170357 A1 | 7/2013 | Anchan et al. |
| 2018/0242115 A1 | 8/2018 | Kim et al. |

FOREIGN PATENT DOCUMENTS

| | | |
|---|---|---|
| CN | 107040995 | 8/2017 |
| EP | 1475973 | 10/2004 |
| EP | 3269187 | 1/2018 |
| TW | 200735572 | 9/2007 |
| WO | 2010/124421 | 11/2010 |
| WO | 2017/133501 | 8/2017 |

OTHER PUBLICATIONS

Ghandri, et al. "A Low-Complexity Scheduling for Joint Unicast and Multicast Transmissions in LTE-A Network", International Wireless Communication & Mobile Computing Conference(IWCMW); 2018; 136-141.

Huang, et al. "A Dynamic Hybrid Counting Procedure for eMBMS of 3GPP", IEEE Wireless Communications and Networking Conference(WCNC); 2017; 1-6.

Liu, et al. "A Multicast Transmission Scheme in Small Cell Networks with Wireless Backhaul", IEEE Global Communications Conference; 2017; 1-6.

Damera, et al. "Optimized MCE scheduling algorithm to allocate radio resources using evolved Round Robin scheduling", International Conference on Applied and Theoretical Computing and Communication; 2016; 770-775.

Kaliski, et al. "Dynamic Resource Allocation Framework for MooD (MBMS Operation On-Demand)", IEEE Transactions on Broadcasting; 2016; 903-917.

Chan, et al. "How to Reduce Unexpected eMBMS Session Disconnection: Design and Performance Analysis", IEEE Wireless Communications Letters; 2018; 126-129.

Taiwanese Decision of Grant for Taiwanese Patent Application No. 108125993 dated Jun. 29, 2020.

Nguyen, et al. "Service Continuity for eMBMS in LTE/LTE-Advanced Network: Standard Analysis and Supplement", Published in 2014 IEEE 11th Consumer Communication and Networking Conference (CCNC), Jan. 10-13, 2014.

* cited by examiner

BROADCAST MULTICAST SERVICE CENTER FOR MBMS BROADCAST SERVICE MANAGEMENT AND METHOD THEREOF

CROSS-REFERENCE TO RELATED APPLICATIONS

This application claims priority to Taiwan Patent Application No. 108125993, filed on Jul. 23, 2019. The entirety of the above-mentioned patent application is hereby incorporated by reference herein and made a part of this specification.

BACKGROUND

1. Technical Field

The present disclosure relates to management mechanisms for multimedia broadcast multicast service (MBMS) broadcast services, and, more particularly, to a broadcast multicast service center and a method applicable to an MBMS broadcast service management.

2. Description of Related Art

With the rising of network generation, the network traffic increases rapidly and is occupied by more and more video and audio data. More network infrastructure is needed to come to the market to solve the network congestion problem due to the rapid development of network traffic. Evolved multimedia broadcast multicast service (eMBMS) technique is defined in a third generation partnership project (3GPP) for multi-media streaming, file download, and mission critical communication, as well as the newly added cellular vehicle-to-everything (C-V2X) technique (Rel. 14).

eMBMS executes V2X application through the information transmission of application interface, such as a Uu interface. After an on-board unit (OBU), a pedestrian or a roadside unit (RSU) uploads data, base station broadcasts by the eMBMS technique. Service characteristics thereof include serving non-fixed network traffic (i.e., may be no network traffic for a long period of time), taking the timeliness of the service broadcast into consideration when the network traffic occurs in services, and occupying wireless resources by services having high-priority attributes. When the MBMS broadcast services are performed in the above scenarios, a broadcast multicast service center (BM-SC) is in charge of the management of MBMS sessions. According to the current standard, the broadcast multicast service center will cease its services in the following conditions: (1) a request of element between the broadcast multicast service center and a base station is rejected; (2) the effective time of a session is expired; or (3) it is detected that the services have no network traffic. As shown in FIG. 1, the broadcast multicast service center (BM-SC) establishes service connection according to a request from an application server (AS). When the BM-SC determines that the service connection has no network traffic, the conventional procedure is to interrupt the service connection and enable a multi-cell/ multicast coordination entity (MCE) to release the wireless resources occupied by the service connection. However, after the conventional procedure restarts the service connection, inasmuch as the MBMS is activated according to the multicast control channel (MCCH) modification period setting, user equipment (UE) has a window period of 5 to 10 seconds, and the system information block (SIB) will not update information until the window period elapses. Therefore, the UE cannot receive real-time messages from a V2X application in an event-triggering type, which is applicable to, for example, roadside equipment-to-pedestrian (R2P) services or roadside equipment-to-vehicle (R2V) services.

It can be seen from the above that under the conventional MBMS broadcast service management mechanism, when the broadcast multicast service center (BM-SC) determines that the service connection has no network traffic, the service connection will be interrupted to release resources; however, this is not the best way. It will become a technical issue in the art that the technical personnel is eager to solve at present as to how to find an alternative solution to solve the resource occupation when there is no network traffic and to avoid the UE window period that may be caused by restarting the service connection.

SUMMARY

The present disclosure provides a broadcast multicast service center applicable to multimedia broadcast multicast service (MBMS) broadcast service management, comprising: a monitoring module configured for monitoring a service connection of a mobile network between an application server and a user equipment so as to generate a resource merging instruction when the service connection has no network traffic; a resource merging module configured for searching for other service resources that are currently being executed and can share a service when receiving the resource merging instruction from the monitoring module, and analyzing the other service resources and the service connection through quality of service parameter screening and a broadcast service area comparison to determine a selected service resource from the other service resources; and an adjusting module configured for adjusting a scheduling period of the service connection to be smaller than a scheduling period of the selected service resource to enable subsequent network traffic packets of the service connection to share network traffic of the selected service resource.

The present disclosure further provides a method applicable to MBMS broadcast service management, comprising: monitoring a service connection of a mobile network between an application server and a user equipment so as to generate a resource merging instruction when the service connection has no network traffic; searching for other service resources that are currently being executed and can share a service according to the resource merging instruction; analyzing the other service resources and the service connection through quality of service parameter screening and a broadcast service area comparison to determine a selected service resource from the other service resources; and adjusting a scheduling period of the service connection to be smaller than a scheduling period of the selected service resource to enable subsequent network traffic packets of the service connection to share network traffic of the selected service resource.

BRIEF DESCRIPTION OF DRAWINGS

The disclosure can be more fully understood by reading the following detailed description of the embodiments, with reference made to the accompanying drawings, wherein.

DETAILED DESCRIPTION

In the following detailed description, for purposes of explanation, numerous details are set forth in order to provide a thorough understanding of the disclosed embodiments. It will be apparent, however, that one or more embodiments may be practiced without these details. In other instances, well-known structures and devices are schematically shown in order to simplify the drawings.

In the present disclosure, modules, devices, equipment, servers etc. include microprocessors and memories. Also, algorithms, data, programs etc. are stored in memories or chips, where microprocessors can load data, algorithms or programs from memories and perform data analysis and calculation. According to the present disclosure, each of the modules in a broadcast multicast service center includes a microprocessor and memory, and can perform analysis operations. Therefore, the detailed hardware structures of the modules, units or equipment according to the present disclosure are also realized in the same manner.

Figure 1:
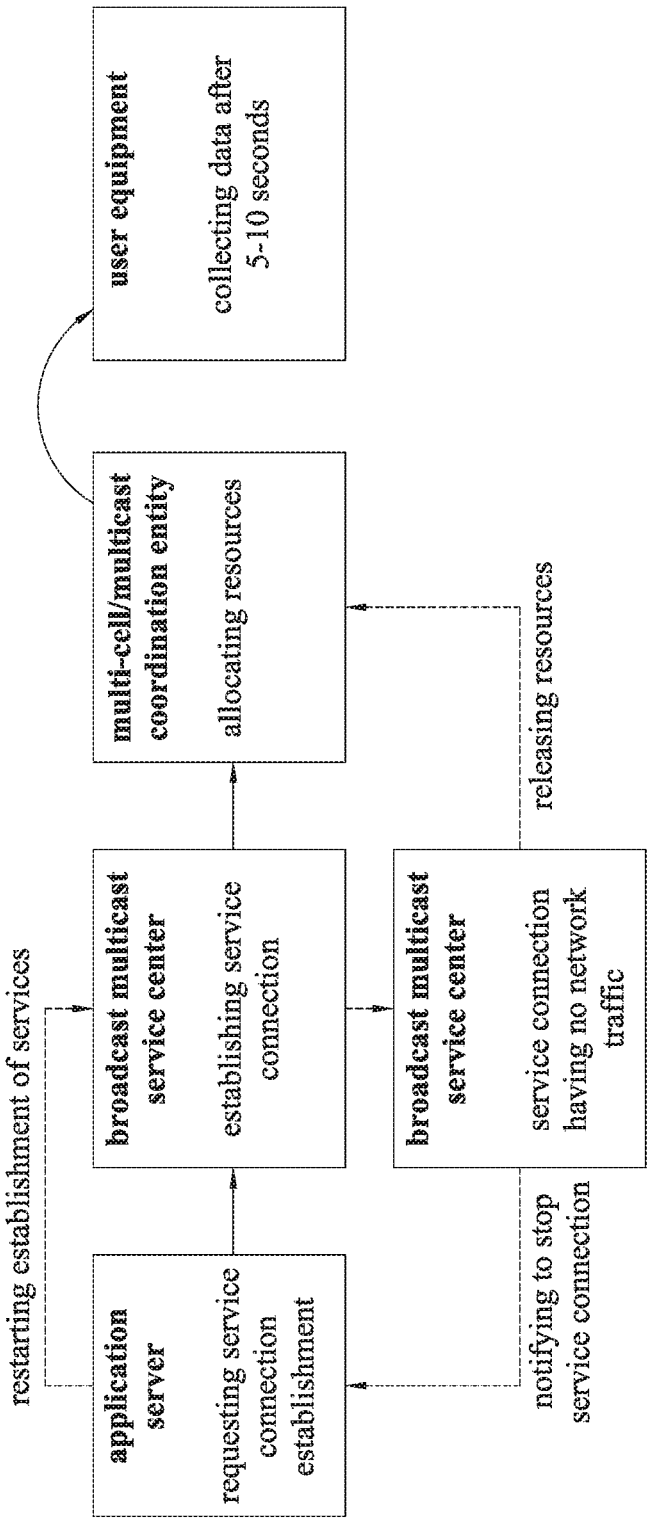
FIG. 1 is a schematic diagram illustrating a processing mechanism for no network traffic of a service connection in the related art.
Figure 2:
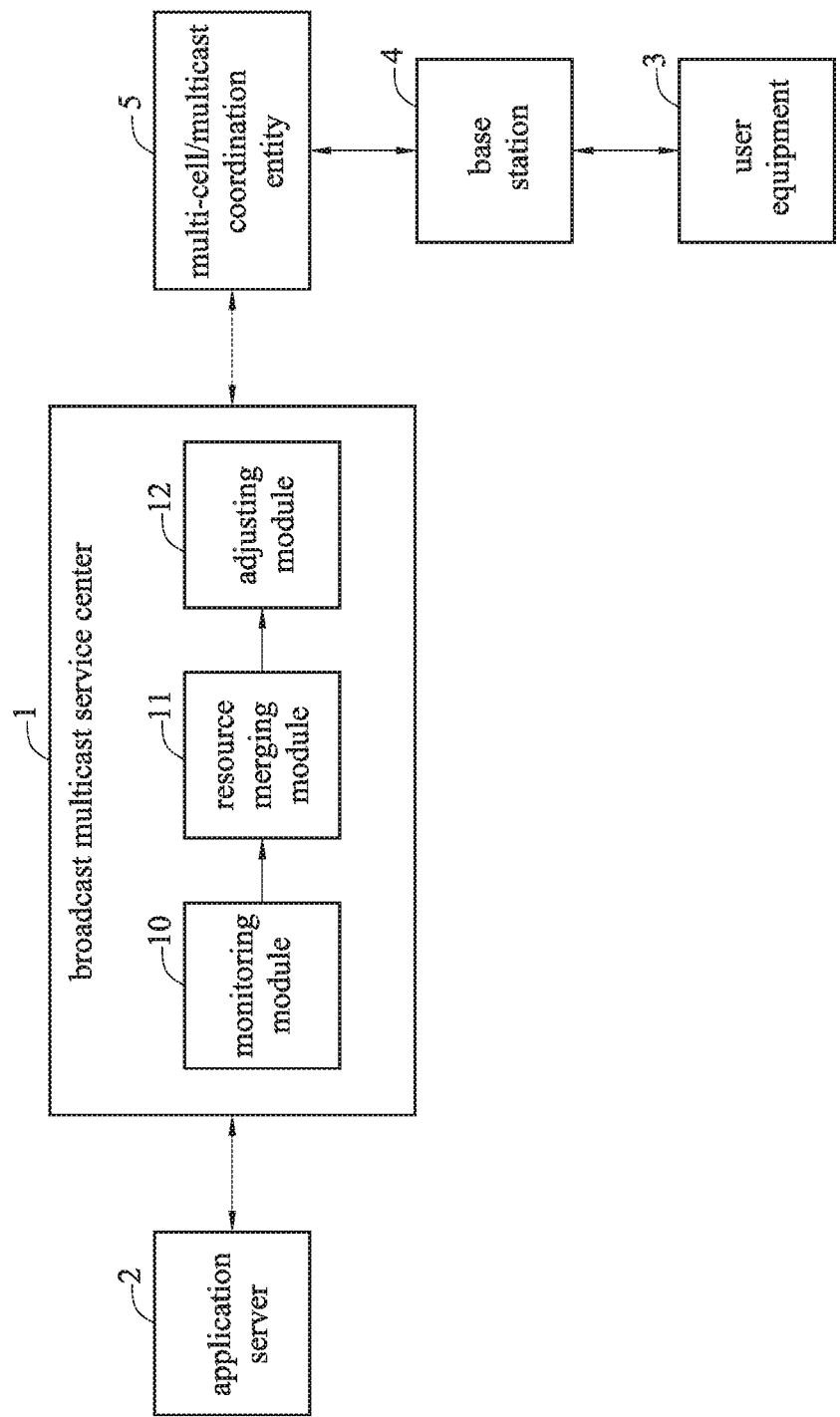
FIG. 2 is a functional block diagram of a broadcast multicast service center applicable to MBMS broadcast service management according to the present disclosure.

FIG. 2 is a functional block diagram of a broadcast multicast service center applicable to an MBMS broadcast service management according to the present disclosure. The broadcast multicast service center of the present disclosure is used for searching for shared service resources after detecting that the mobile network service connection has no network traffic, so as to enable the mobile network service connection to be directed to the shared service resources. In an embodiment, the mobile network is a V2X. In an embodiment, the broadcast multicast service center 1 may be an apparatus provided in a network for providing MBMS broadcast services, such as providing network transmission between an application server 2 and a user equipment 3. A multi-cell/multicast coordination entity 5 is between the broadcast multicast service center 1 and a base station 4 to allocate wireless resources. The broadcast multicast service center 1 includes a monitoring module 10, a resource merging module 11 and an adjusting module 12.

The monitoring module 10 monitors a V2X service connection between the application server 2 and the user equipment 3 to generate a resource merging instruction when the service connection has no network traffic. For V2X service connection or general service connection, packets will be transmitted through the broadcast multicast service center 1. The V2X service connection may have a discontinuation phenomenon (i.e., no event to be transmitted) and have no network traffic, and the available resources are wasted when the bandwidth is occupied and the V2X service connection has no network traffic. Therefore, the broadcast multicast service center 1 can monitor the condition of the network traffic of the V2X service connection, and generate a resource merging instruction when the V2X service connection has no network traffic.

When receiving the resource merging instruction from the monitoring module 10, the resource merging module 11 searches other service resources that are currently being executed and can share a service. The resource merging module 11 analyzes the other service resources and the service connection through quality of service (QoS) parameter screening and a broadcast service area comparison to determine a selected service resource from the other service resources. In an embodiment, the resource merging module 11 finds out sharable service resources for the V2X service connection. When receiving the resource merging instruction, the resource merging module 11 searches a suitable one from other service connection (i.e., general service connection) passing through the broadcast multicast service center 1, and selects the other service resources that meet shared conditions through the mechanisms, such as the quality of service parameter screening and the broadcast service area comparison. The selected one of the other service resources is called a selected service resource. The quality of service parameter screening and the broadcast service area comparison are detailed as follows.

The quality of service parameter screening takes one of the other service resources that has higher priority and a delay budget greater than the service connection as the selected service resource. In order to avoid the dependent and selected service resource that has low priority from being discarded during a network congestion, the selected service resource has to have higher priority than the original V2X service connection, so as to ensure that the service after dependency is still competitive. The selected service resource also has to have the delay budget greater than the original V2X service connection, so as to ensure that the data content of the original V2X service connection is transmitted in a priority manner.

The foregoing broadcast service area comparison includes three scenarios as follows: the service areas of the selected service resource correspond to the service areas of the V2X service connection; the service areas of the selected service resource are larger than the service areas of the V2X service connection; and no other service resource that has service areas less than the service areas of the V2X service connection can be found. If service areas of a candidate service resource correspond to the service areas of the V2X service connection, the service areas of the candidate service resource can satisfy the service areas of the original V2X service connection. Therefore, under this service resource, there is no need to adjust the packet transmission areas of the original V2X service connection.

If the service areas of the candidate service resource are larger than the service areas of the V2X service connection, this indicates that the service areas of the candidate service resource can also satisfy the service area of the original V2X service connection. However, inasmuch as the service areas of the selected service resource is still larger, in order to prevent the original V2X service connection packet from being transmitted to the service area which is not original, the packet is routed through a flow ID. In such scenario, the route of the subsequent network traffic packets of the original V2X service connection is determined through a flow ID of the subsequent network traffic packets after sharing the selected service source.

When other service resources that are not less than the service areas of the V2X service connection cannot be found and the service areas of a single candidate service resource cannot satisfy the service areas of the original V2X service connection, several candidate service resources each having service areas less than the service areas of the V2X service connection can be combined to form a selected service resource. Inasmuch as the several candidate service resources can encompass all of the service areas of the original V2X service connection, all subsequent network traffic packets of the original V2X service connection are transmitted to the service areas of the selected service resource. The broadcast service area comparison will be described in the following paragraphs.

The adjusting module 12 adjusts a scheduling period of the service connection to be smaller than a scheduling period of the selected service resource to enable subsequent network traffic packets of the service connection, when passing through the broadcast multicast service center 1, so as to share the network traffic of the selected service resource. After the resource merging module 11 finds out the selected service resource that is suitable to the shared conditions, the V2X service connection and the selected service resource transmit packets in the same network traffic. Therefore, the V2X service connection, even having no network traffic, will not occupy additional bandwidth. In order to ensure that the V2X service connection can transmit packets definitely, the adjusting module 12 will adjust the scheduling period of the V2X service connection to be smaller than the scheduling period of the selected service resource. Therefore, the packets of the V2X service connection can be ensured to transmit at a higher frequency, and a situation that the packets cannot be transmitted in real time due to too large the scheduling period is avoided.

In order to avoid the V2X service connection from constantly occupying the bandwidth of the general service connection, the present disclosure further enables the V2X service connection to no longer share the dependent service resource, after a predetermined period of time is elapsed. In an embodiment, after the V2X service connection shares the selected service resource for a predetermined period of time, the resource merging module 11 allows the V2X service connection to be redirected to a newly created service connection by means of a session update or a new session start.

In an embodiment of the present disclosure, in order for the dependent service resource to provide the V2X service connection with better sharing performance, when the resource merging module 11 searches a new service resource that is better than the selected service resource in accordance with the results of the quality of service parameter screening and the broadcast service area comparison, the new service resource is used as a newly selected service resource, and the adjusting module 12 adjusts the subsequent network traffic packets of the V2X service connection to share the network traffic of the newly selected service resource.

Figure 3:
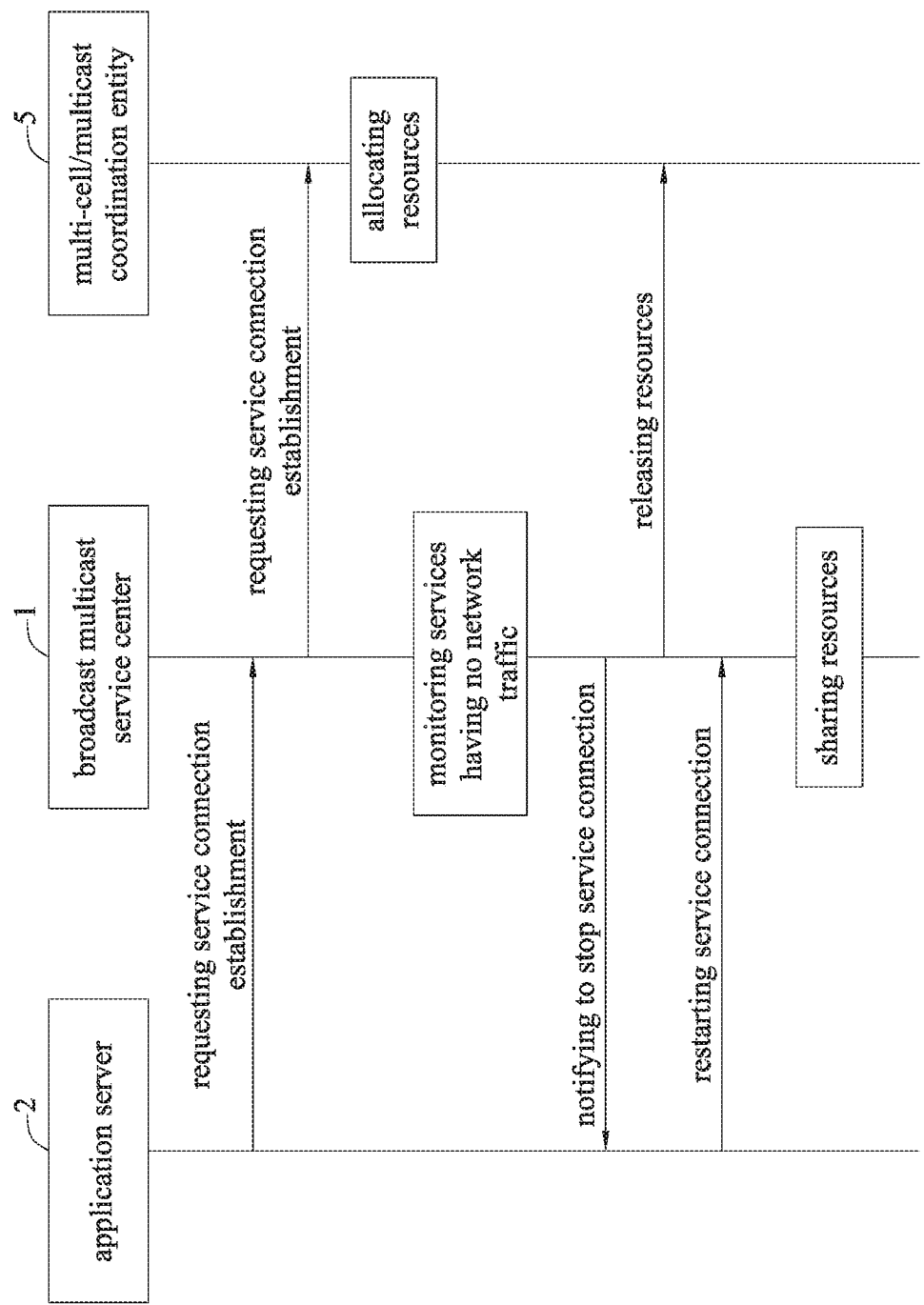
FIG. 3 is a flow chart of a management mechanism of an MBMS broadcast service according to the present disclosure.

FIG. 3 is a flow chart illustrating a management mechanism of an MBMS broadcast service according to the present disclosure. The resource sharing mechanism includes: establishing a V2X service connection between an application server and a user equipment; notifying the application server to stop a service connection when BM-SC finds that the V2X service connection has no network traffic; and performing resource sharing/merging to find other suitable service resources by the MBMS center, thereby making the V2X service connection unaffected. In a normal service processing environment, when the service connection is to be established, the application server 2 will request the broadcast multicast service center 1 to establish service connection, and then the broadcast multicast service center 1 will request the multi-cell/multicast coordination entity 5 to establish the service connection and allocate resources based on service demands. When monitoring that the service connection has no network traffic, in order to avoid idling the resources, the broadcast multicast service center 1 will notify the application server 2 to stop service connection, and notify the multi-cell/multicast coordination entity 5 to release the resources of the service connection. Then, the application server 2 requests the broadcast multicast service center 1 to establish the service connection again, and the broadcast multicast service center 1 executes the resource sharing processing, i.e., finding out other service resources that meet the sharing conditions.

Figure 4:
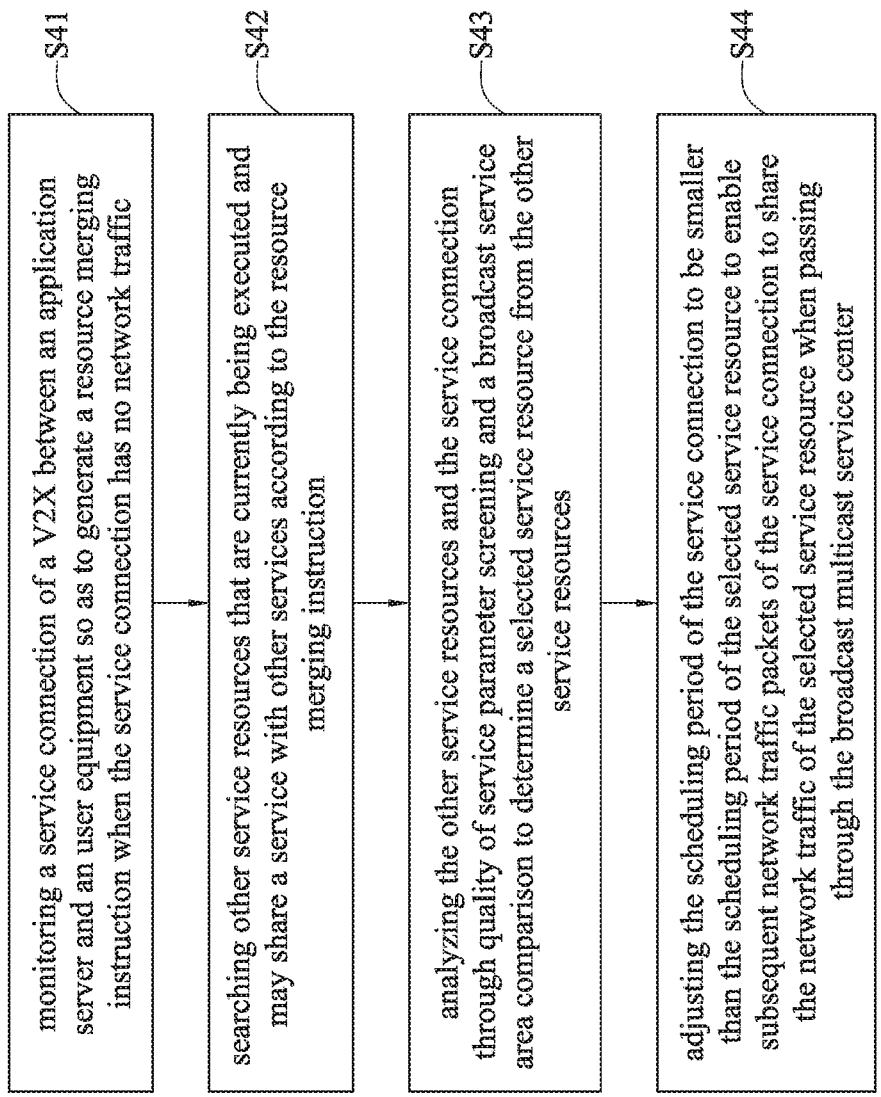
FIG. 4 is a flow chart of a method applicable to the MBMS broadcast service management according to the present disclosure.

FIG. 4 is a flow chart illustrating a method applicable to the MBMS broadcast service management according to the present disclosure. In step S41, a mobile network, such as a V2X service connection, between the application server and the user equipment is monitored, and a resource merging instruction is generated when the service connection has no network traffic. Step S41 illustrates that the broadcast multicast service center will monitor the status of the network traffic of the V2X service connection and generate the resource merging instruction when the V2X service connection has no network traffic.

In step S42, other service resources that are currently being executed and may share a service with other services are searched according to the resource merging instruction. Step S42 illustrates that in the demand of merging resources, the broadcast multicast service center searches other service resources that are currently being executed and may share a service, i.e., other services that exist and can share with other services.

In step S43, the other service resources and the service connection are analyzed through quality of service parameter screening and a broadcast service area comparison to determine a selected service resource from the other service resources. In order to ensure that the other dependent service resources can satisfy the demands of the V2X service connection, a suitable service resource as the selected service resource can be found through the quality of service parameter screening and the broadcast service area comparison.

In step S43, the quality of service parameter screening includes taking one of the other service resources that has higher priority than the V2X service connection and a delay budget greater than the V2X service connection as the selected service resource, in order to avoid the dependent and selected service resource from being discarded in a network congestion due to its low priority that would originally cause the V2X service connection to be disconnected. The quality of service parameter screening ensures that the service after dependency is still competitive, and the consideration of the delay budget ensures that the data content of the V2X service connection can be transmitted in a priority manner.

In step S43, the broadcast service area comparison has different selection mechanisms for the service areas of different sizes of the selected service resource. The service areas of the selected service resource that match or are greater than the service areas of the V2X service connection can be selected. In the scenario that the service areas of the selected service resource match the service areas of the V2X service connection, the service areas of the selected service resource can satisfy the routing of subsequent network traffic packets of the V2X service connection, without having the problems that the service area is too large or too small (i.e., some areas receiving no data). If the service areas of the selected service resource are greater than the service areas of the V2X service connection, a flow ID is used to ensure how the packets of the V2X service connection should be routed, i.e., an original service areas of the V2X service connection, to which the packets are transmitted. If no other single service resource can satisfy the above scenario, several other service resources each having a service area less than the service areas of the V2X service connection are combined to form the selected service resource. In such scenario, all subsequent network traffic packets of the V2X service connection are transmitted to the service areas of each of the multiple other service resources.

In step S44, the scheduling period of the service connection is adjusted to be less than the scheduling period of the selected service resource, so as to enable subsequent network traffic packets of the service connection to share the network traffic of the selected service resource when passing through the broadcast multicast service center. The procedure of step S44 avoids a scenario that the packets cannot be transmitted in real time due to too large the scheduling period. The adjustment of the scheduling period of the V2X service connection to be less than the scheduling period of the selected service resource ensures that the packets of the V2X service connection can be transmitted in real time.

In the method according to the present disclosure, after the V2X service connection shares the selected service resource for a predetermined period of time, the V2X service connection is redirected to a newly created service connection through a session update or a new session start. After the resources are shared, in order to avoid the dependent service resource to be affected after a long period of time that the V2X service connection is dependent on the other service resources, the V2X service connection of the present disclosure is redirected to the newly created service connection through the session update or the new session start, after the selected service resource is shared for a period of time.

In the method according to the present disclosure, after the V2X service connection shares the selected service resource and when the quality of service parameter screening and the broadcast service area comparison of a new service resource is better than the selected service resource, the new service resource is used as a newly selected service resource, so as to enable subsequent network traffic packets of the service connection to share the network traffic of the newly selected service resource. This step is after the resources are shared. When a better candidate is found that can replace the currently dependent service resource, the V2X service connection can be dependent on the service connection of the newly selected service resource.

Figure 5:
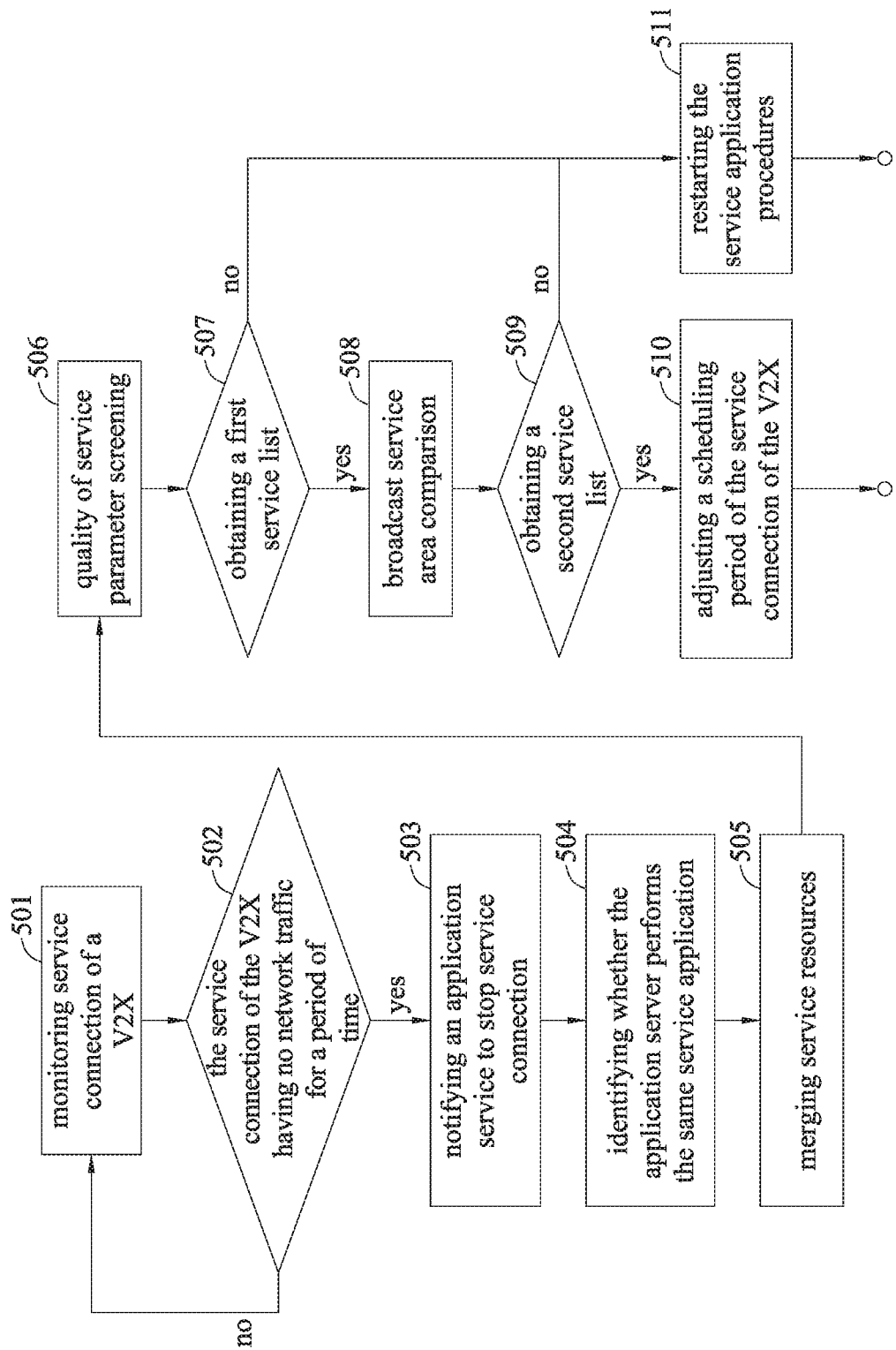
FIG. 5 is a flow chart illustrating the incorporation of a V2X service connection and the search for other suitable service resources according to the present disclosure.

FIG. 5 is a flow chart illustrating the incorporation of a V2X service connection and the search for other suitable service resources and internal operations of a broadcast multicast service center according to the present disclosure. Steps 501-505 correspond to step S41 of FIG. 4. In step 501, the present disclosure is to monitor the status of network traffic of the V2X service connection. In step 502, it is determined that the V2X service connection has no network traffic for a period of time. In step 503, the broadcast multicast service center notifies the application server to stop service connection. In step 504, whether the application server performs the same service application is identified. In step 505, the service resources are ready to be merged.

Steps 506-509 correspond to steps S42 and S43 of FIG. 4. In steps 506 and 507, quality of service parameter screening is executed to find the service resources that have higher priority in a first service list. In steps 508 and 509, a broadcast service area comparison is executed to eliminate candidate service resources in the first service list that have service areas that cannot satisfy the V2X service connection based on the sizes of the service areas, and generate a second service list which includes the service resources that satisfy the condition. There may be one or more service resources in the second service list, and one of the service resources in the second service list is selected to be a selected service resource. If steps 507 and 509 cannot find any service resources that satisfy the condition, it means that other service resources cannot be used for the V2X service connection, and only step 511 can be entered to restart the service application procedures.

After step 509, any service resources in the second service list that satisfy the condition is selected to be the selected service resource. Then, step 510 is executed, in which the scheduling period of the V2X service connection is adjusted, so as to enable the V2X service connection to transmit data at high frequencies under the resource merging and ensure that the V2X service connection can provide services.

Figure 6:
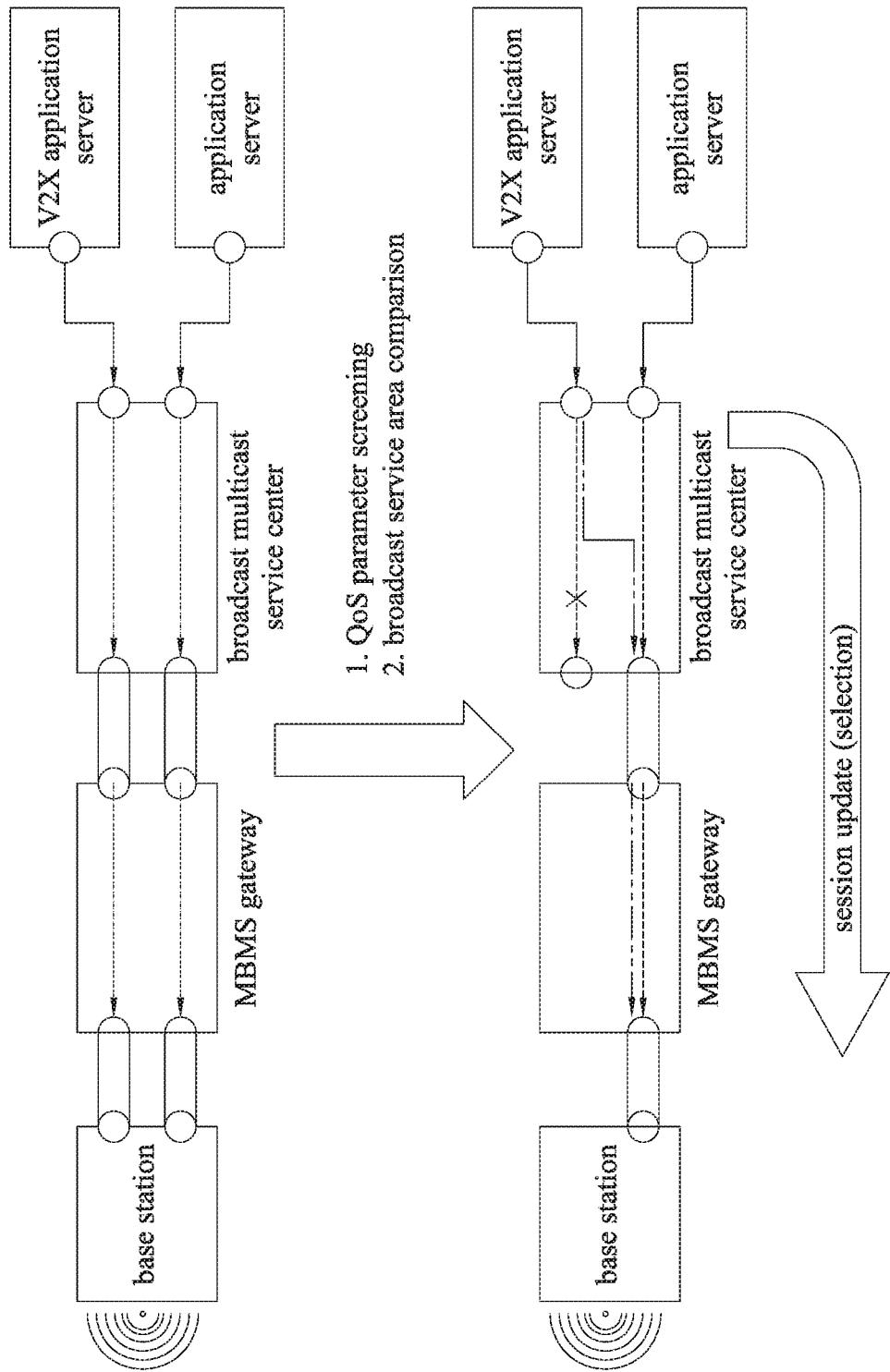
FIG. 6 is a schematic diagram for incorporating a V2X service connection into other service resources according to the present disclosure.

FIG. 6 is a schematic diagram for incorporating a V2X service connection into other service resources according to the present disclosure. As shown in the upper half portion of FIG. 6, the V2X service connection has its own service connection originally, and the V2X application server can connect to a base station (E-UTRAN NodeB, eNB) through a broadcast multicast service center (BM-SC) and an MBMS gateway (MBMS GW). Similarly, general service connection also has its own service connection, and an application server can connect to the base station through the broadcast multicast service center and the MBMS gateway. When the broadcast multicast service center (BM-SC) determines that the V2X service connection has no network traffic and resources have to be merged, the resource merging module of the broadcast multicast service center finds out other suitable service resources and merges the resources through the quality of service (QoS) parameter screening and the broadcast service area comparison.

As shown in the lower half portion of FIG. 6, after service resources that correspond to the conditions are selected, the broadcast multicast service center ceases the connection of the original V2X application server. Then, the packets transmitted by the V2X application server will route to the path transmitted by the application server, when the packets pass through the broadcast multicast service center. The broadcast multicast service center merges the network traffic of the V2X service connection into general service connection to reduce bandwidth occupied when the V2X service connection has no network traffic.

Figure 7:
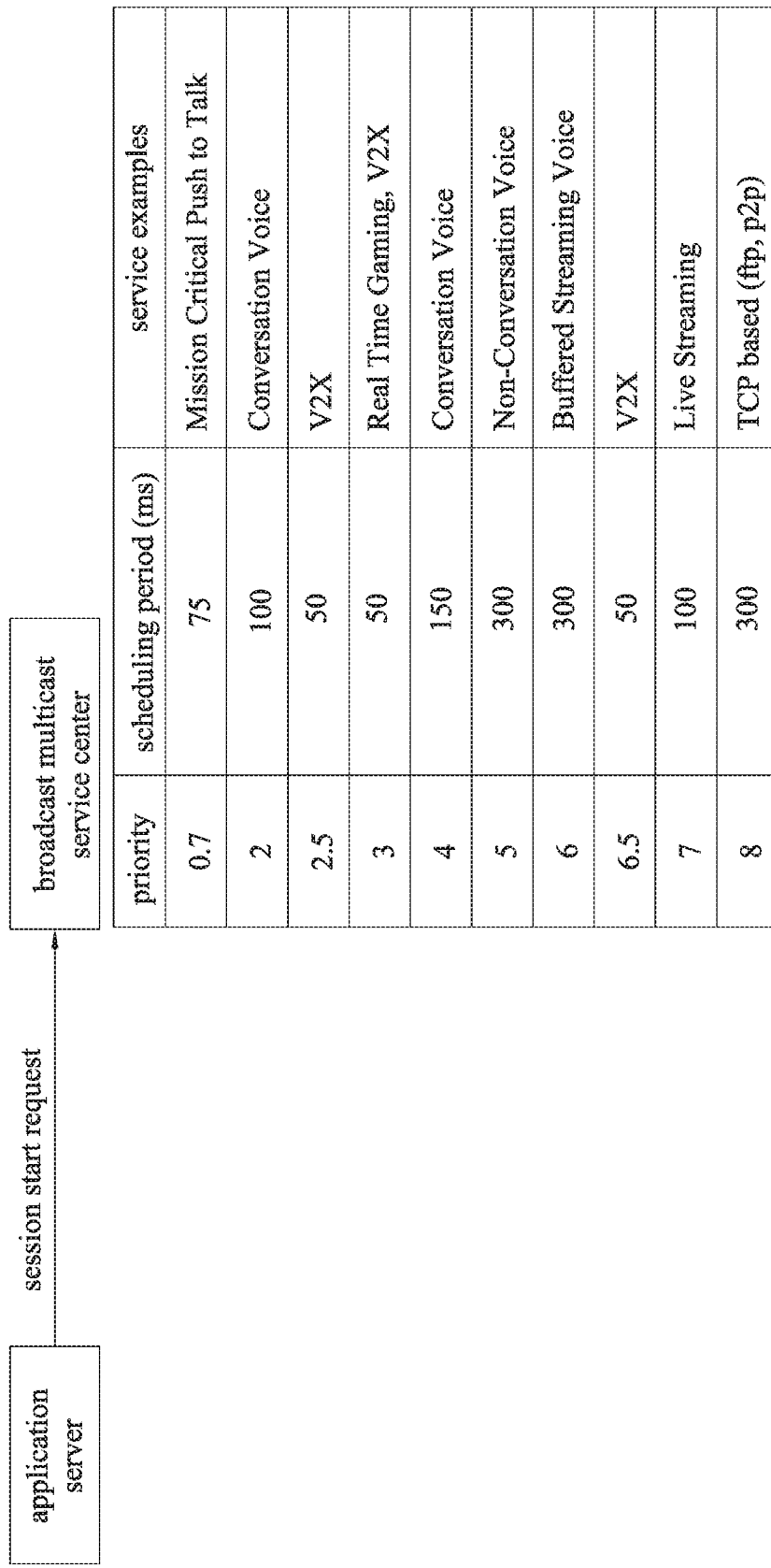
FIG. 7 is a schematic diagram illustrating quality of service parameter screening in a broadcast multicast service center according to the present disclosure.

FIG. 7 is a schematic diagram illustrating quality of service parameter screening in a broadcast multicast service center according to the present disclosure. The application server (AS) issues a session start request to the broadcast multicast service center. The connection statuses of the V2X service connection and the general service connection will be recorded in the broadcast multicast service center. Each of the connections (e.g., the services at the right-hand side of the table) has its own priority and scheduling period. The broadcast multicast service center executes the quality of service parameter screening based on the table of the broadcast multicast service center.

As shown in the table of FIG. 7, the V2X service connections may have high and low priority and the scheduling period of 50. Based on the above-described quality of service parameter screening conditions, if it is needed to find dependency for the third V2X service connection and the third V2X service connection has the priority of 2.5 and the scheduling period of 50, the candidate service resource has to have greater priority than the V2X service connection (i.e., smaller number of the priority) and greater scheduling period than the V2X service connection. The first or second ones are general connections and comply with the above described conditions. Therefore, the service resources of the first or second ones may be selected when the third V2X service connection has the dependency demand.

Figure 8A:
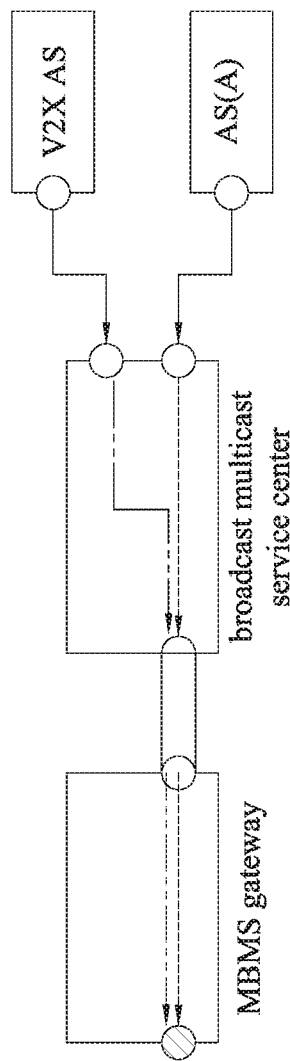
FIGS. 8A-8C are schematic diagrams of processing of three different area sizes when performing a broadcast service area comparison according to the present disclosure.
Figure 8B:
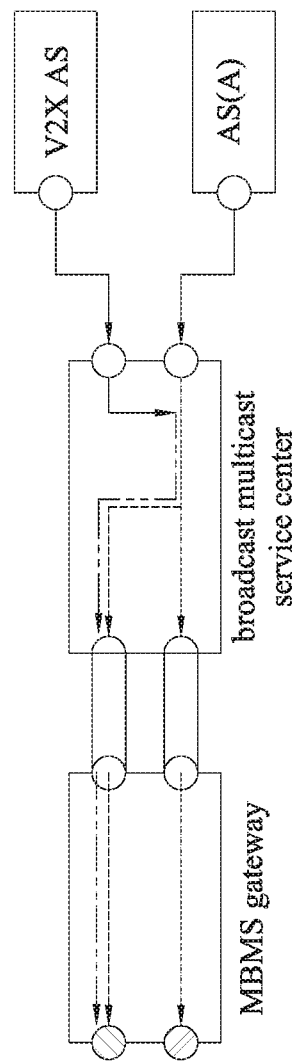
Figure 8C:
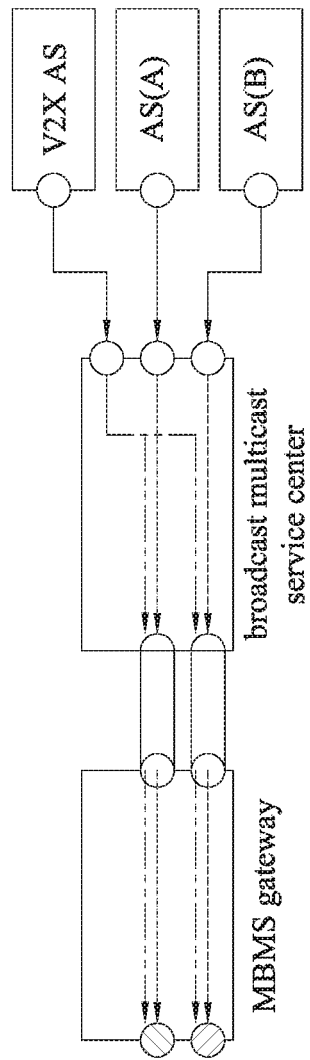
Figure 8C:
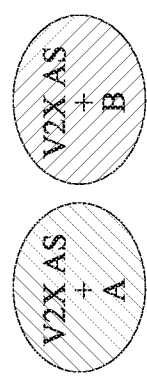

FIGS. 8A-8C are schematic diagrams of processing of three different area sizes when performing the broadcast service area comparison according to the present disclosure. As shown in FIG. 8A, when the service areas of the selected service resource determined by the broadcast multicast service center match the service areas of the V2X service connection, the V2X service connection may direct dependency on the selected service resource without any adjustments, since the service areas that the V2X service connection needs can be encompassed by the service areas of the selected service resource. Therefore, when packets passing through the broadcast multicast service center, packets of the V2X service connection of the V2X application server (V2X AS) will be routed to the path of the service connection of the application server A (AS(A)).

As shown in FIG. 8B, when the service areas of the selected service resource of the broadcast multicast service center are greater than the service areas of the V2X service connection, the service areas of the selected service resource can encompass the service areas that the V2X service connection needs, in order to avoid packets of the V2X service connection transmitted to a non-service area of the V2X service connection. The flow ID is used based on a session update manner to determine how to route the packets when the packets passing through the broadcast multicast service center. When passing through the broadcast multicast service center, the V2X service connection packets of the V2X application server (V2X AS) will route to the path of the service connection packets of the application server A (AS(A)). However, whether the packets are transmitted to a shared service area of the service connections of the V2X AS and the AS(A) or to a service area outside of the V2X AS is determined by the flow ID. The service connection packets of the V2X AS and AS(A) can be transmitted into the range of a small circle in FIG. 8B, and the service connection packets of the AS(A) are transmitted in a range outside of the small circle.

As shown in FIG. 8C, when no single service resource that encompasses the service areas that the V2X service connection is found, several service resources can be combined, such that the service areas of the combined service resources encompass the V2X service connection. The service connection packets of the application server A (AS(A)) and the application server B (AS(B)) will still be transmitted on their own routing paths, while the service connection packets of the V2X AS will be transmitted on the routing paths of the service connections of the application server A (AS(A)) and the application server B (AS(B)). Therefore, the packets of the V2X service connection can be transmitted to the service areas of the application server A (AS(A)) and the application server B (AS(B)) encompassed.

In order to avoid the packets of the V2X service connection transmitted to the non-service area of the V2X service connection, the flow ID is used to determine how to route the packets when the packets passing through the broadcast multicast service center. When passing through the broadcast multicast service center, the V2X service connection packets of the V2X AS will route to the path of the service connection of the AS(A) or the AS(B).

Figure 9A:
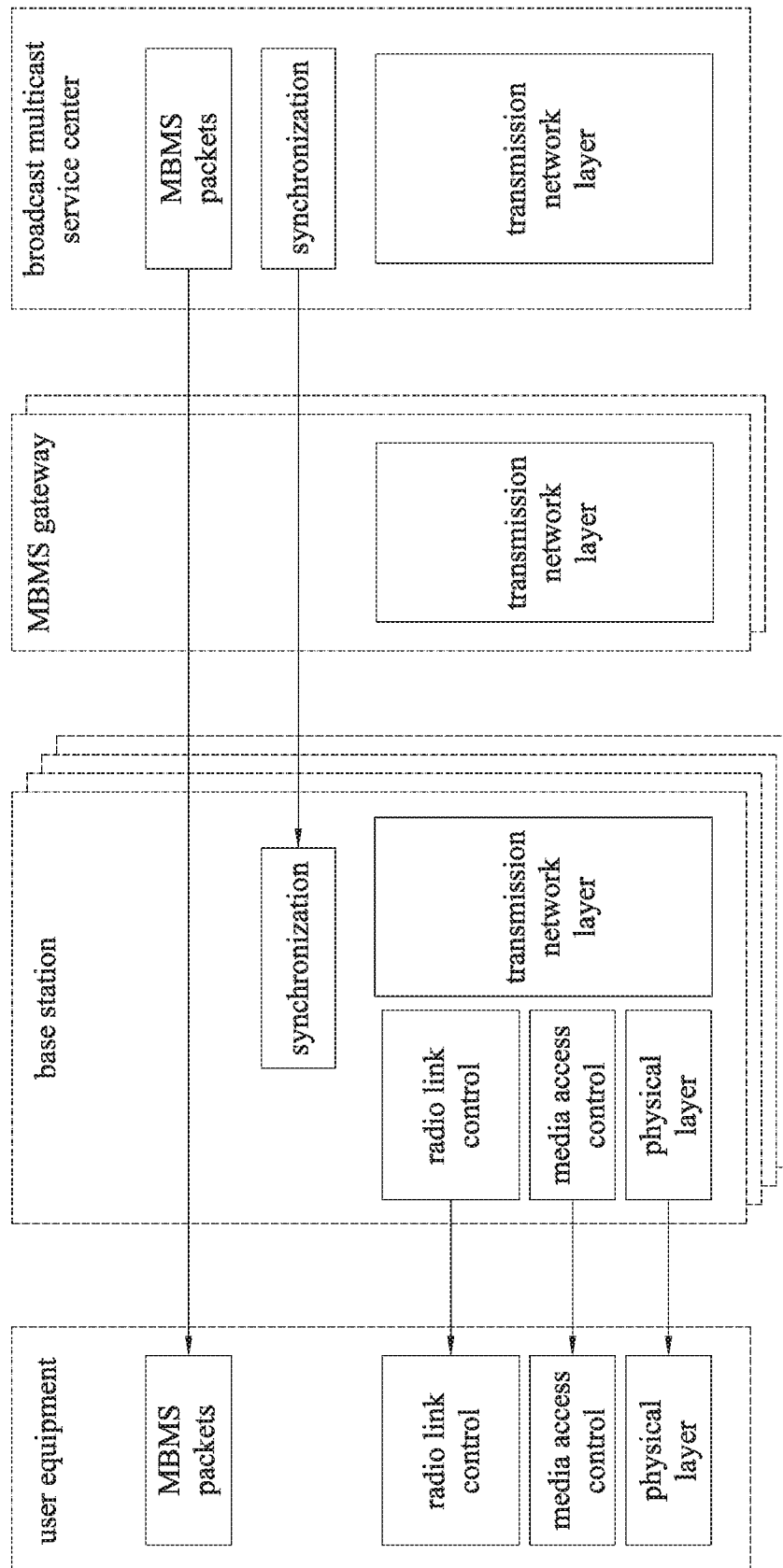
FIGS. 9A and 9B are schematic diagrams illustrating adjustment of a scheduling period according to the present disclosure.
Figure 9B:
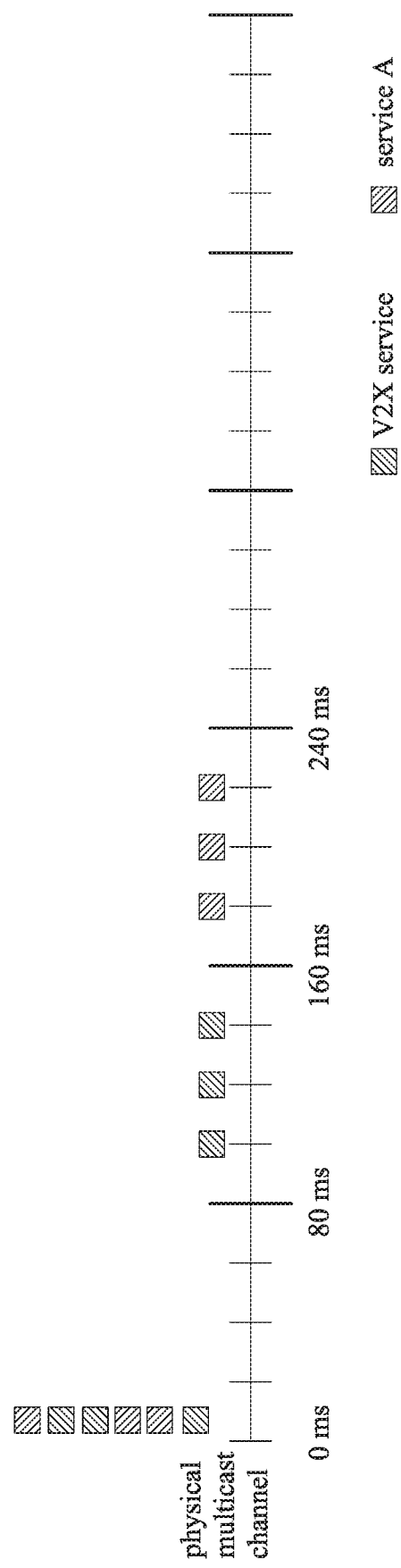

FIGS. 9A and 9B are schematic diagrams illustrating adjustment of a scheduling period according to the present disclosure. As shown in FIG. 9A, the broadcast multicast service center determines how to transmit MBMS packets to user equipment. After the V2X service connection depends on the selected service resource, the packets of the V2X service connection are routed via the routing path of the selected service resource. At the same time, the broadcast multicast service center will transmit synchronization data to a base station, and the base station generates needed radio frames.

As shown in FIG. 9B, in order to ensure the message transmission priority of the V2X service connection, the V2X service connection that has a lower scheduling period is provided, so as to enable the V2X service connection to be sent faster than the selected service resource. As the schematic diagram of a physical multicast channels below shows, the adjusting module of the broadcast multicast service center can adjust and transmit the packets of the V2X service connection at a frequency of 80 ms, and the general service connection A transmits packets at a frequency of 160 ms. Under this scenario, in the beginning of 80 ms, the packets of the V2X service connection will be transmitted; at 160 ms, the packets of the V2X service connection and the general service connection A will be transmitted; at 240 ms, the packets of the V2X service connection will be transmitted; and the packets of the general service connection A will be transmitted at 320 ms. The adjustment of the scheduling period ensures that the packets of the V2X service connection can be sent more quickly.

Figure 10A:
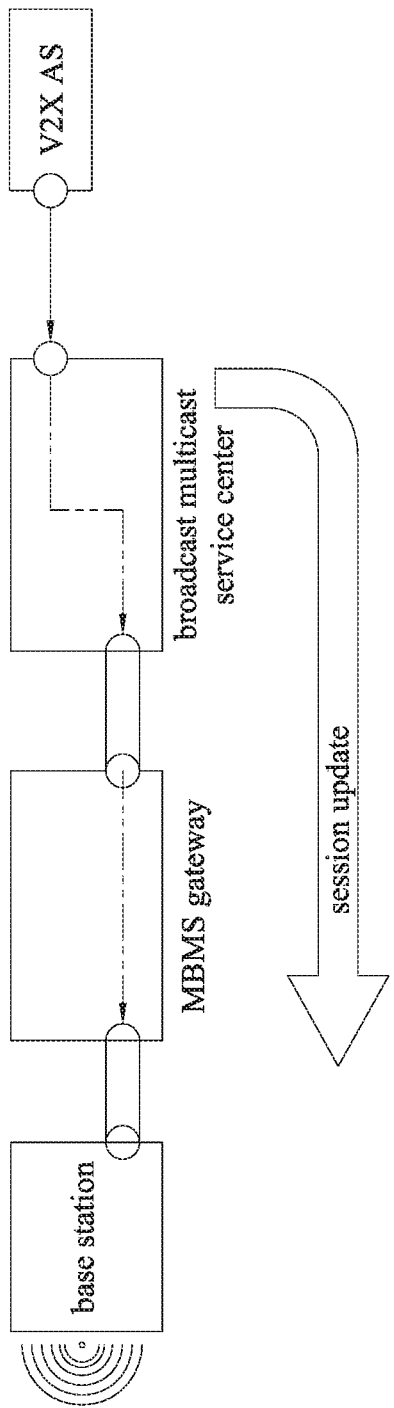
FIGS. 10A and 10B are schematic diagrams illustrating a service termination mechanism according to the present disclosure.
Figure 10B:
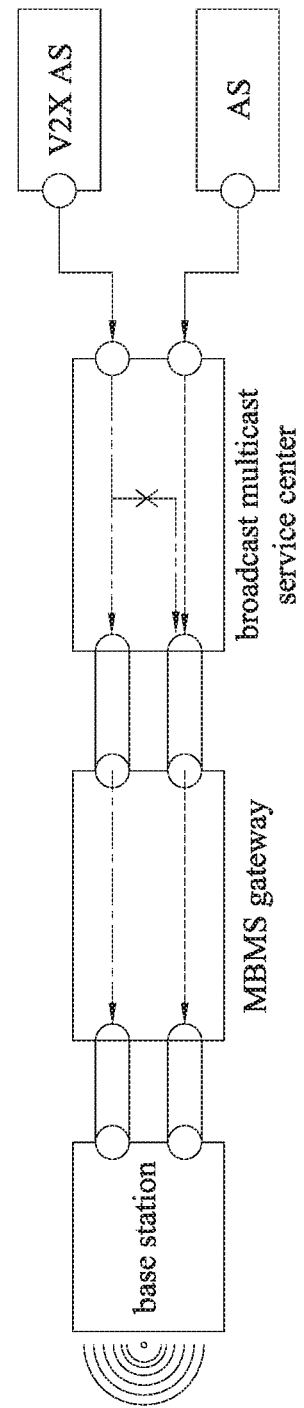

FIGS. 10A and 10B are schematic diagrams illustrating a service termination mechanism according to the present disclosure. As shown in FIG. 10A, if the dependent service performs a service termination process, the broadcast multicast service center uses a control flow of a standard session update to adjust the setting parameters that the V2X service needs, e.g., lower the priority or the needed bandwidth, so as to enable the V2X service to become an independent service resource. The flow of the standard session update is defined in 3GPP SPEC. In an embodiment, the update information can be generated by a broadcast multicast service center (BM-SC) disposed at a core network and pass through an MBMS gateway (MBMS GW), a mobility management entity (MME) and a multi-cell/multicast coordination entity (MCE), and a base station (eNB) at a radio access network (RAN) is notified of changing the services.

As shown in FIG. 10B, after a predetermined period of time of the V2X service connection dependent on the service connection is set, the V2X service connection of the V2X application server (V2X AS) will not share the service resource on which it depends, e.g., interrupting the service connection of the application server (AS) on which it depends originally. V2X application server (V2X AS) establishes a new service connection to avoid the selected service resource from being occupied for a long period of time and affecting the selected service connection. The mechanism for establishing a newly service connection is similar to a mechanism by which new network service connection is established originally, and further description thereof hereby omitted.

In the broadcast multicast service center and method applicable to MBMS broadcast service management according to the present disclosure, when it is detected that the V2X service connection has no network traffic, the network traffic of the V2X service connection is merged into other service resources, so as to achieve the objective that the services are seamless and the transmission network traffic is not occupied. Based on the quality of the service parameter screening and broadcast service area comparison, other service resources that are suitable to the V2X service connection can be found, so as to avoid the situations that the other low priority service resources are replaced by high priority service resources in a resource congestion or the service areas of the other service resources cannot satisfy the demands of the V2X service connection. Therefore, the present disclosure is applicable to an on-vehicle application in an event triggering form, such as the development trend of serving network of large amounts of data traffic in mobile multimedia video/audio, thereby providing better efficiency for the multicast services of evolved-multimedia broadcast multicast service (LTE eMBMS) and ensuring the service quality.

It will be apparent to those skilled in the art that various modifications and variations can be made to the disclosed embodiments. It is intended that the specification and examples be considered as exemplary, with a true scope of the disclosure being indicated by the following claims and their equivalents.

What is claimed is:

1. A broadcast multicast service center applicable to multimedia broadcast multicast service (MBMS) broadcast service management, comprising:
    a monitoring module configured for monitoring a service connection of a mobile network between an application server and a user equipment so as to generate a resource merging instruction when the service connection has no network traffic;
    a resource merging module configured for searching for other service resources that are currently being executed and share a service when receiving the resource merging instruction from the monitoring module, and analyzing the other service resources and the service connection through quality of service parameter screening and a broadcast service area comparison to determine a selected service resource from the other service resources; and
    an adjusting module configured for adjusting a scheduling period of the service connection to be smaller than a scheduling period of the selected service resource to enable subsequent network traffic packets of the service connection to share network traffic of the selected service resource.

2. The broadcast multicast service center of claim 1, wherein the quality of service parameter screening includes one of the other service resources having higher priority than the service connection and having a delay budget greater than the service connection as the selected service resource.

3. The broadcast multicast service center of claim 1, wherein the broadcast service area comparison includes one of the other service resources that matches a service area or is greater than a service area of the service connection as the selected service resource.

4. The broadcast multicast service center of claim 3, wherein when the one of the other service resources that is greater than the service area of the service connection is used as the selected service resource, a route of the subsequent network traffic packets of the service connection is determined through a flow ID of the subsequent network traffic packets after sharing the selected service resource.

5. The broadcast multicast service center of claim 1, wherein the broadcast service area comparison includes combining several other service resources whose service area is smaller than the service area of the service connection as the selected service resource, and the subsequent network traffic packets of the service connection are transmitted to the service area of each of the several other service resources.

6. The broadcast multicast service center of claim 1, wherein the resource merging module redirects the service connection to a newly created service connection by means of a session update or a new session start after the service connection shares the selected service resource for a predetermined period of time.

7. The broadcast multicast service center of claim 1, wherein the resource merging module searches for a new service resource that is better than the selected service resource in accordance with results of the quality of service parameter screening and the broadcast service area comparison, the new service resource is used as a newly selected service resource to enable the subsequent network traffic packets of the service connection to share network traffic of the newly selected service resource.

8. A method applicable to MBMS broadcast service management, comprising:
    monitoring a service connection of a mobile network between an application server and a user equipment so as to generate a resource merging instruction when the service connection has no network traffic;
    searching for other service resources that are currently being executed and share a service according to the resource merging instruction;
    analyzing the other service resources and the service connection through quality of service parameter screening and a broadcast service area comparison to determine a selected service resource from the other service resources; and
    adjusting a scheduling period of the service connection to be smaller than a scheduling period of the selected service resource to enable subsequent network traffic packets of the service connection to share network traffic of the selected service resource.

9. The method of claim 8, wherein the quality of service parameter screening includes one of the other service resources having higher priority than the service connection and having a delay budget greater than the service connection as the selected service resource.

10. The method of claim 8, wherein the broadcast service area comparison includes one of the other service resources that matches a service area or is greater than a service area of the service connection as the selected service resource.

11. The method of claim 10, wherein when the one of the other service resources that is greater than the service area of the service connection is used as the selected service resource, a route of the subsequent network traffic packets of the service connection is determined through a flow ID of the subsequent network traffic packets after sharing the selected service resource.

12. The method of claim 8, wherein the broadcast service area comparison includes combining several other service resources whose service area is smaller than the service area of the service connection as the selected service resource, and the subsequent network traffic packets of the service connection are transmitted to the service area of each of the several other service resources.

13. The method of claim 8, further comprising redirecting the service connection to a newly created service connection by means of a session update or a new session start after the service connection shares the selected service resource for a predetermined period of time.

14. The method of claim 8, further comprising searching for a new service resource that is better than the selected service resource in accordance with results of the quality of service parameter screening and the broadcast service area comparison, wherein the new service resource is used as a newly selected service resource to enable the subsequent network traffic packets of the service connection to share network traffic of the newly selected service resource.

* * * * *